April 14, 1942.     F. Y. PEARNE     2,279,490
FRAME FABRICATING MACHINE
Filed April 8, 1940     9 Sheets-Sheet 1
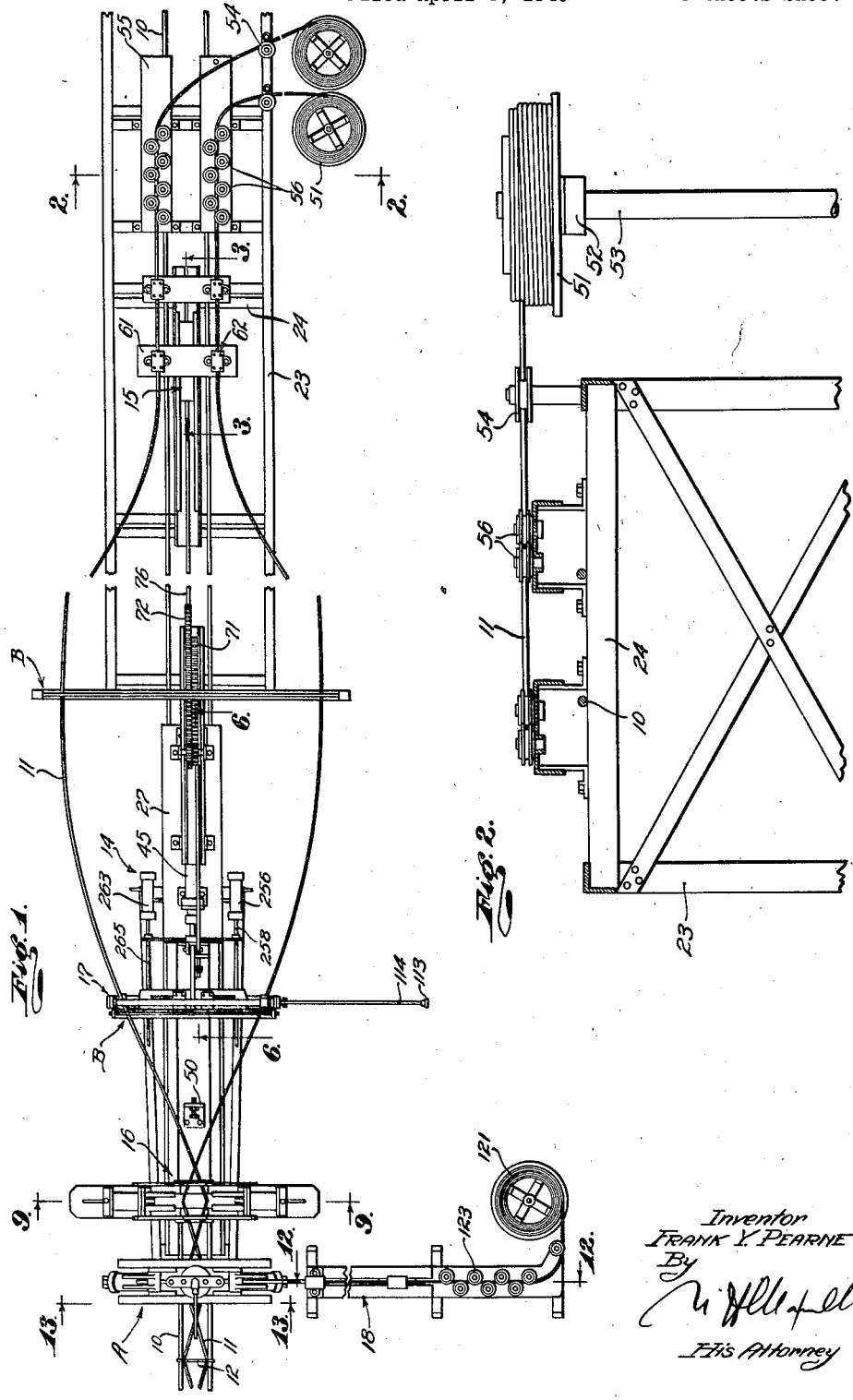
Inventor
FRANK Y. PEARNE
By
His Attorney April 14, 1942.　　　F. Y. PEARNE　　　2,279,490
FRAME FABRICATING MACHINE
Filed April 8, 1940　　　9 Sheets-Sheet 2

Inventor
FRANK Y. PEARNE
By
His Attorney

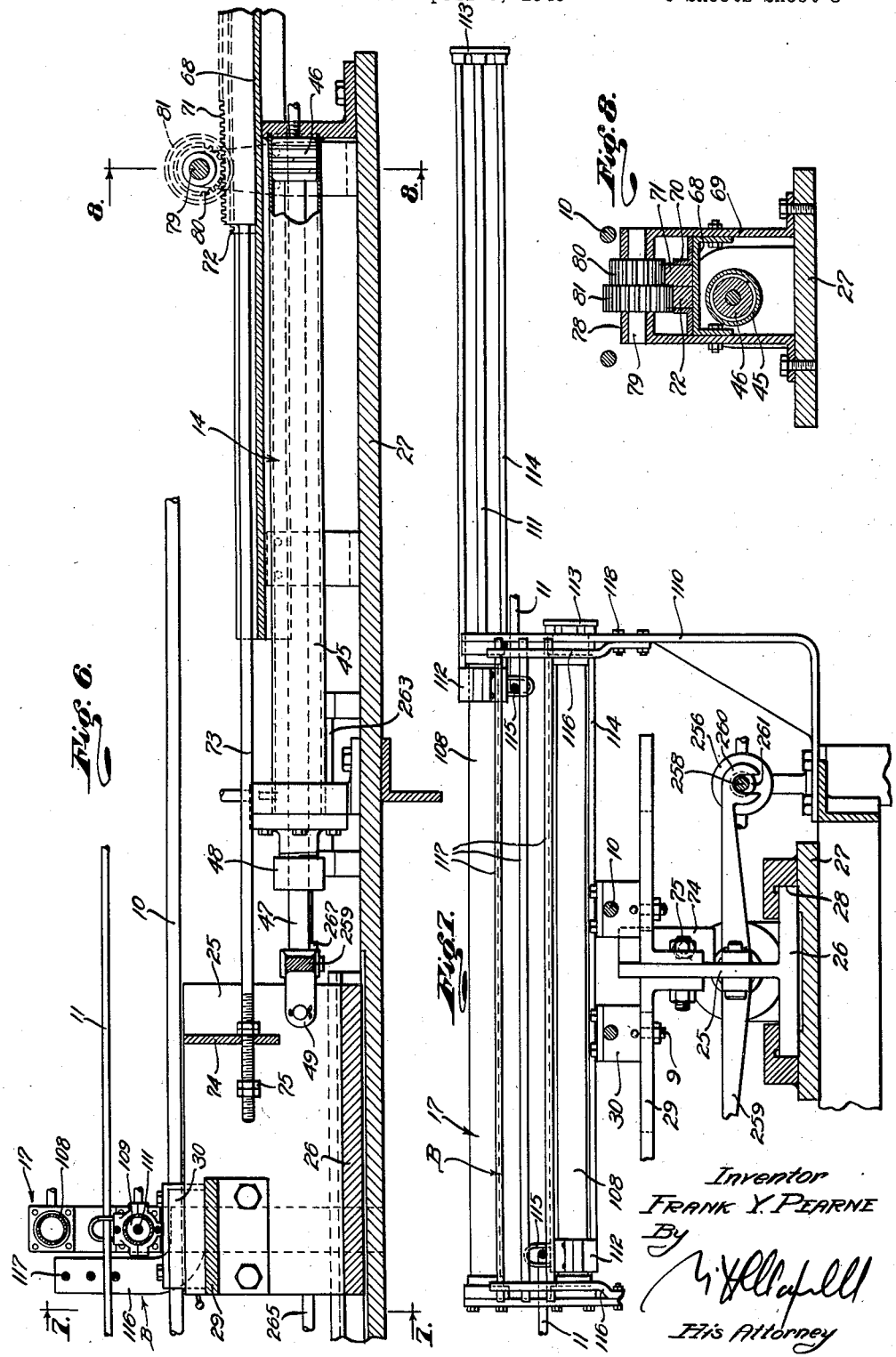

April 14, 1942.  F. Y. PEARNE  2,279,490
FRAME FABRICATING MACHINE
Filed April 8, 1940  9 Sheets-Sheet 4
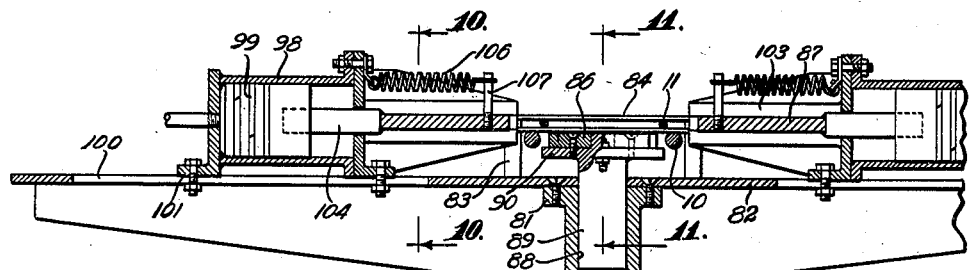
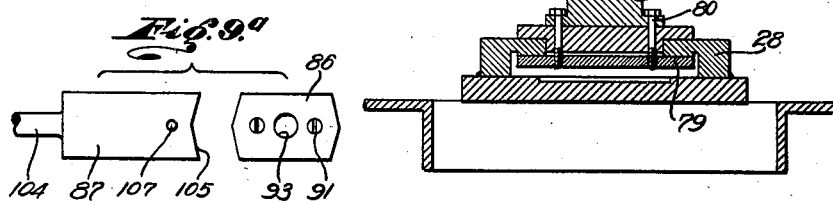
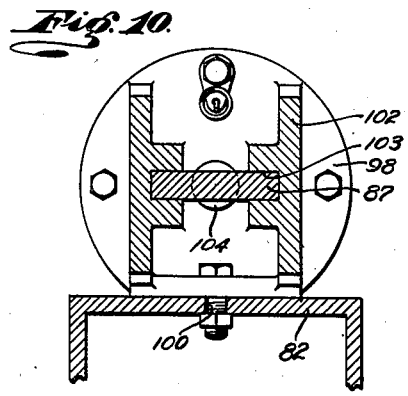
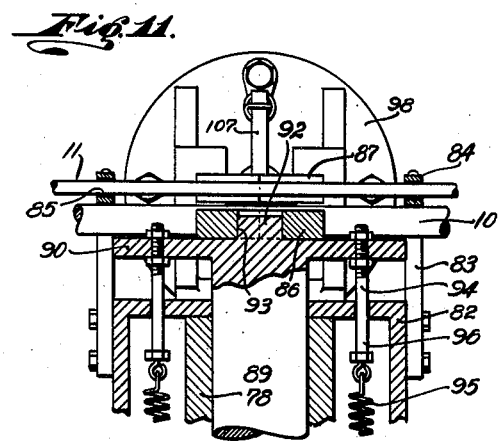
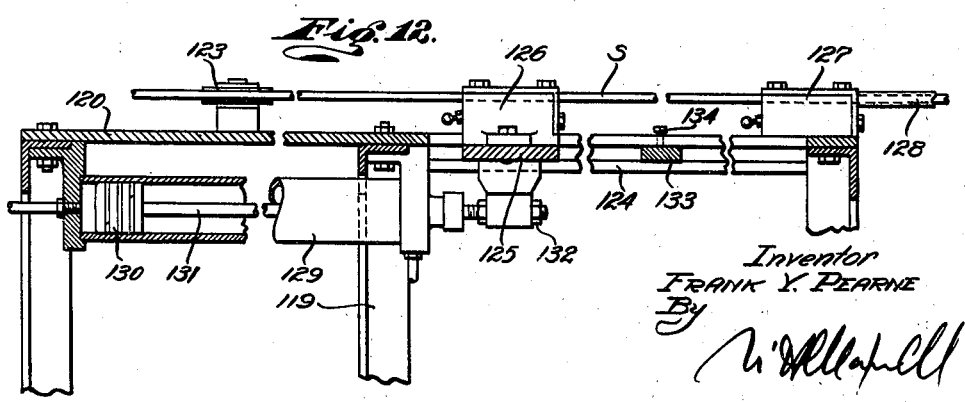
Inventor
FRANK Y. PEARNE
By
His Attorney

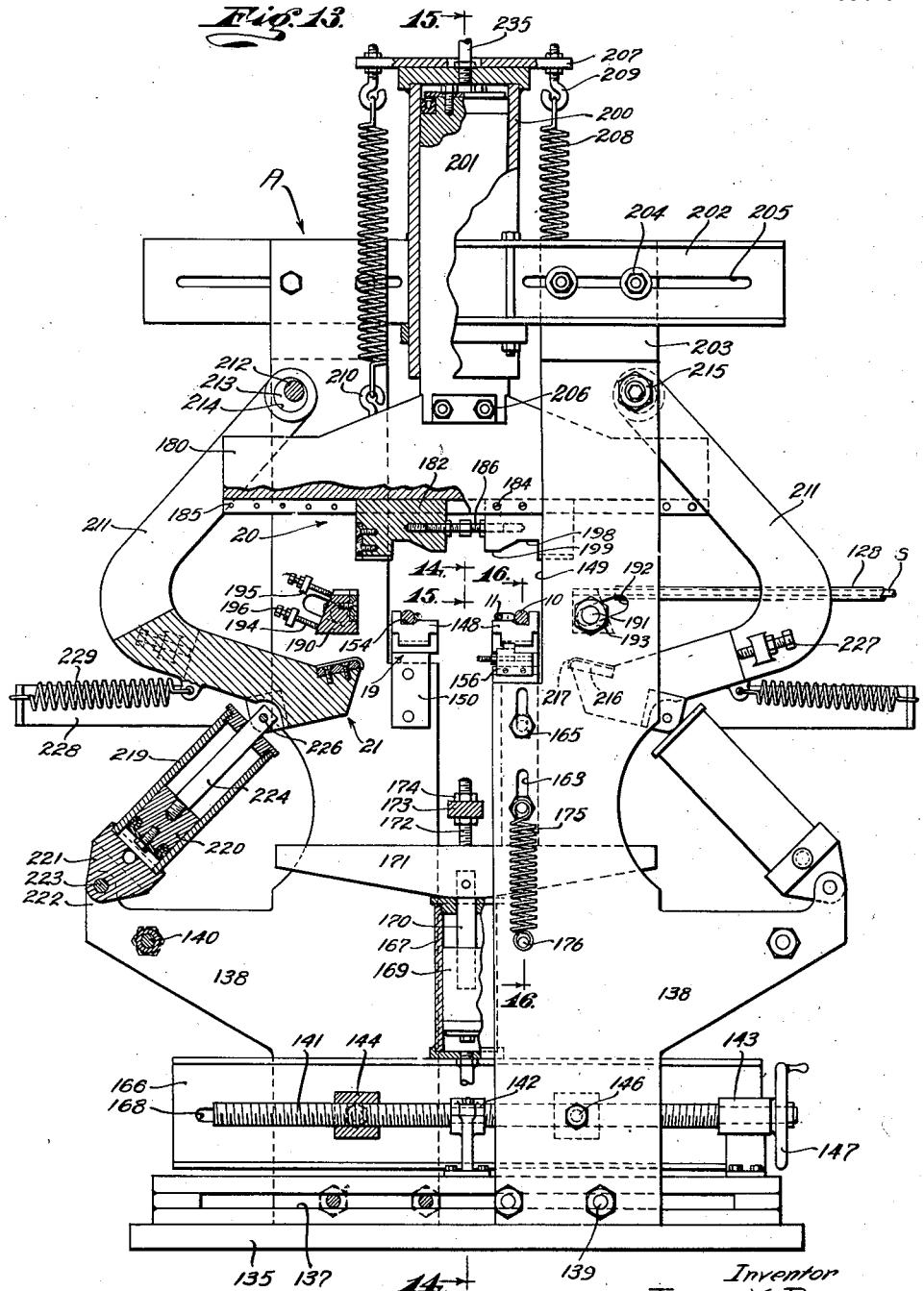

April 14, 1942.                F. Y. PEARNE                 2,279,490
                        FRAME FABRICATING MACHINE
                         Filed April 8, 1940           9 Sheets-Sheet 6
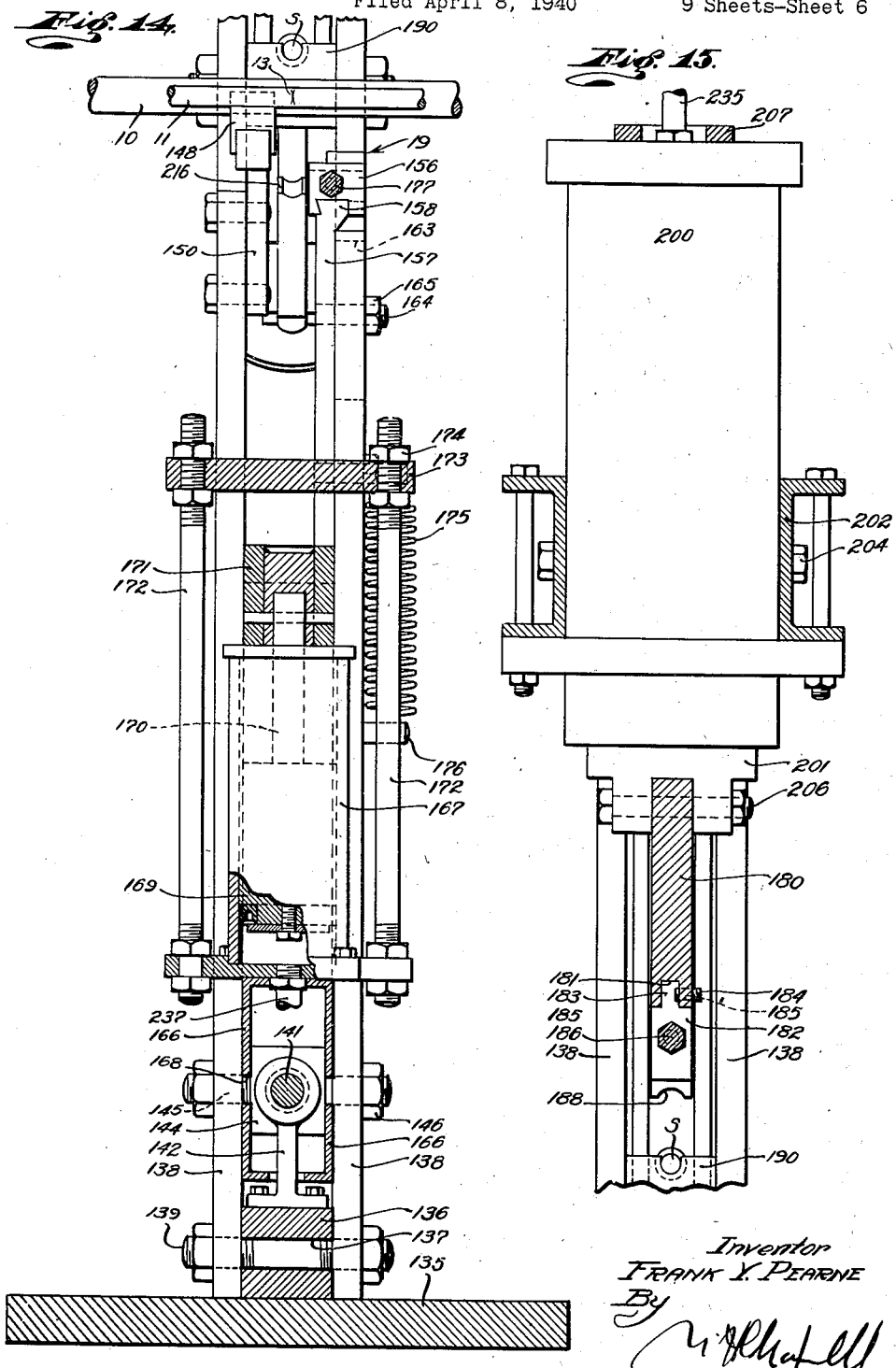
Inventor
FRANK Y. PEARNE
By
His Attorney April 14, 1942.   F. Y. PEARNE   2,279,490
FRAME FABRICATING MACHINE
Filed April 8, 1940   9 Sheets-Sheet 7
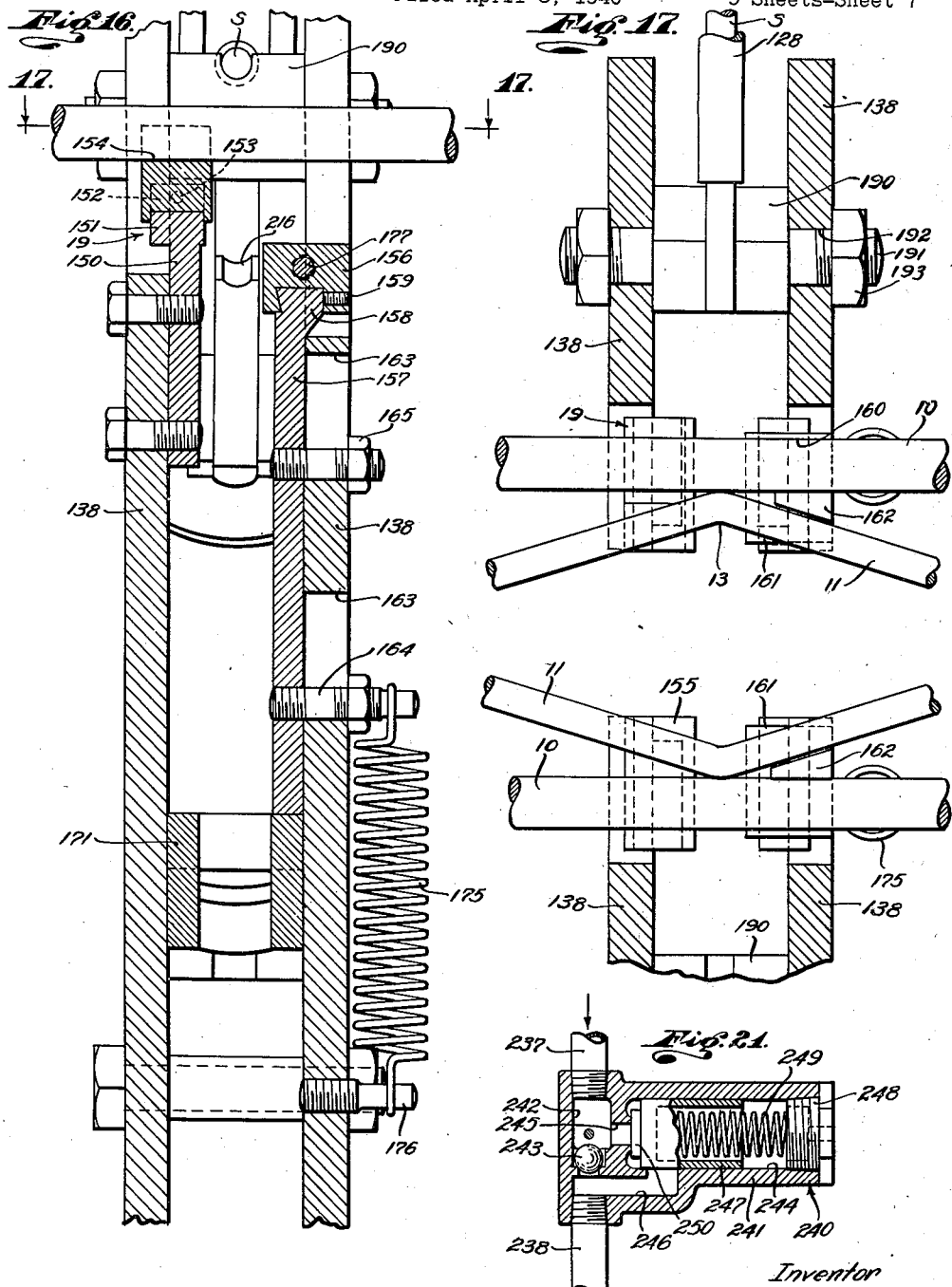
Inventor
FRANK Y. PEARNE
By
His Attorney April 14, 1942.  F. Y. PEARNE  2,279,490
FRAME FABRICATING MACHINE
Filed April 8, 1940  9 Sheets-Sheet 8

Inventor
FRANK Y PEARNE
By
His Attorney

April 14, 1942.   F. Y. PEARNE   2,279,490
FRAME FABRICATING MACHINE
Filed April 8, 1940   9 Sheets-Sheet 9
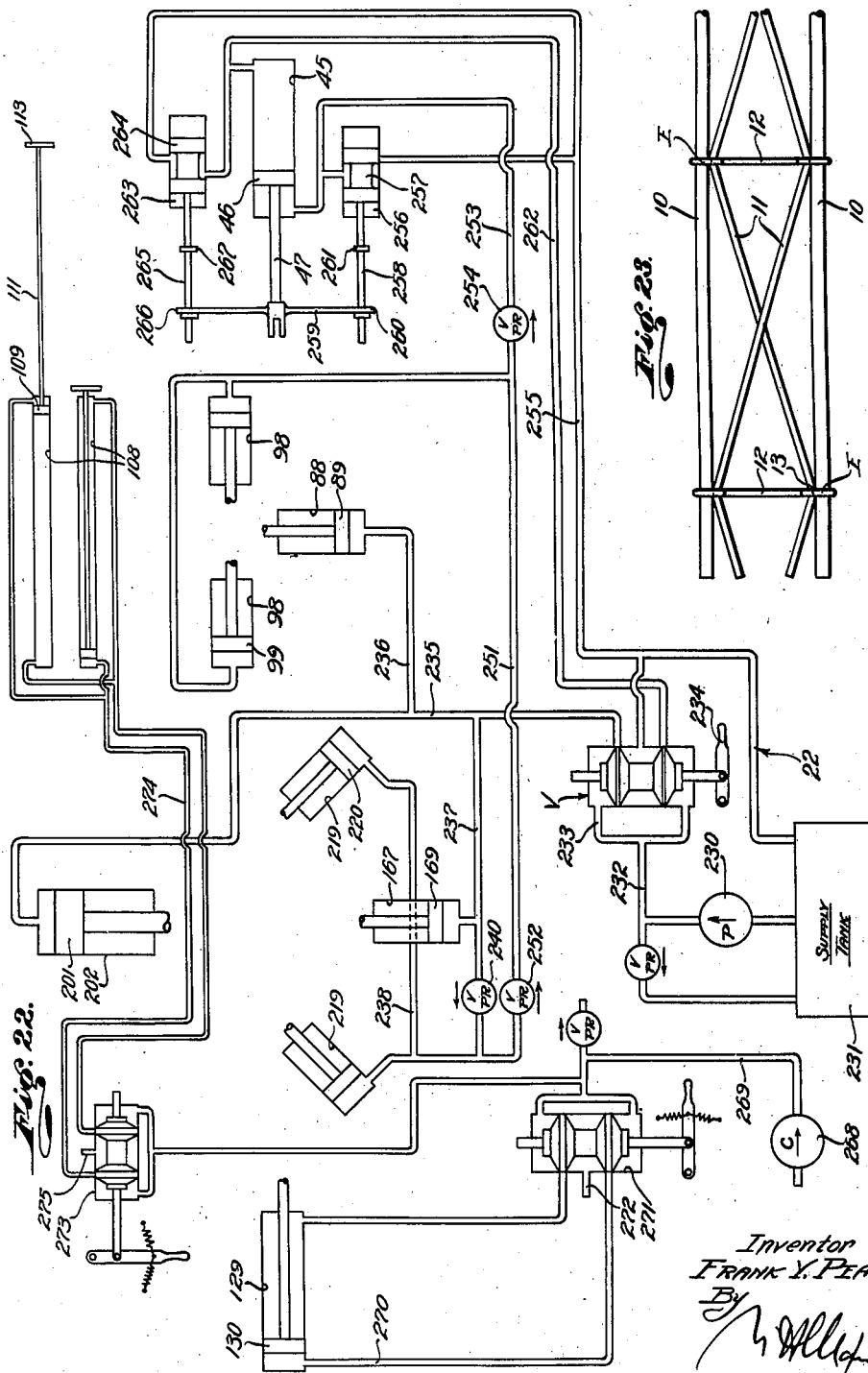
Inventor
FRANK Y. PEARNE
By
His Attorney Patented Apr. 14, 1942

2,279,490

UNITED STATES PATENT OFFICE 2,279,490

FRAME FABRICATING MACHINE

Frank Y. Pearne, Los Angeles, Calif.

Application April 8, 1940, Serial No. 328,409

17 Claims. (Cl. 153—2)

This invention relates to an apparatus for assembling and connecting parts and relates more particularly to a machine for fabricating metal frames. A general object of this invention is to provide a rapid, efficient and dependable machine for fabricating frames for use in building constructions, etc.

Another object of this invention is to provide a machine that simultaneously assembles and ties together a plurality of members to constitute a frame whose parts are in condition for welding to form a strong, rigid assembly.

Another object of this invention is to provide a machine of the character mentioned embodying stock or material feeding, bending and tying mechanisms synchronized to operate most efficiently in the production of the frame.

Another object of this invention is to provide a frame fabricating machine of the character mentioned that is operable to produce frames of practically any length and that is regulable to form frames of different widths and of stock of selected gauges.

Another object of this invention is to provide a fabricating machine of the character mentioned embodying novel and very effective die mechanisms for shaping, bending and tying the several parts of the frame.

Another object of this invention is to provide a machine of the character mentioned in which the tie forming die parts are automatically retracted immediately preceding the advancement of the stock preparatory to the next tying operation.

Another object of this invention is to provide a fabricating machine of the character mentioned embodying a single cylinder and piston actuated mechanism for cutting and initially bending the transverse members of the frame and for holding or clamping the transverse and the diagonal members in place during the final tying operations.

A further object of this invention is to provide a machine of the character mentioned that requires a minimum number of simple manual controls for the several mechanisms or elements of the apparatus.

The various objects and features of my invention will be fully understood from the following detailed description of a typical preferred form and application of the invention, throughout which description reference is made to the accompanying drawings, in which:

Fig. 1 is a top or plan view of the machine of the present invention with the pipes and other elements of the fluid pressure units and controls omitted.

Fig. 2 is an enlarged fragmentary vertical detailed sectional view taken as indicated by line 2—2 on Fig. 1.

Fig. 6 is an enlarged fragmentary vertical detailed sectional view taken substantially as indicated by line 6—6 on Fig. 1.

Fig. 7 is a fragmentary transverse vertical detailed sectional view taken substantially as indicated by line 7—7 on Fig. 6.

Fig. 8 is a vertical detailed sectional view taken as indicated by line 8—8 on Fig. 6.

Fig. 9 is an enlarged fragmentary vertical detailed sectional view taken as indicated by line 9—9 on Fig. 1.

Fig. 9$^a$ is a fragmentary horizontal detailed sectional view illustrating the dies for bending the diagonal members.

Fig. 10 is an enlarged vertical detailed sectional view taken as indicated by line 10—10 on Fig. 9.

Fig. 11 is an enlarged fragmentary vertical detailed sectional view taken as indicated by line 11—11 on Fig. 9.

Fig. 12 is an enlarged fragmentary vertical detailed sectional view of the transverse member feeding means taken as indicated by line 12—12 on Fig. 1.

Fig. 13 is an enlarged vertical detailed sectional view taken substantially as indicated by line 13—13 on Fig. 1.

Fig. 14 is an enlarged fragmentary vertical detailed sectional view taken as indicated by line 14—14 on Fig. 13.

Fig. 15 is an enlarged fragmentary vertical detailed sectional view taken as indicated by line 15—15 on Fig. 13 showing the cylinder of the cutting and initial bending die means in elevation.

Fig. 16 is an enlarged fragmentary vertical detailed sectional view taken as indicated by line 16—16 on Fig. 13.

Fig. 17 is a fragmentary horizontal detailed sectional view taken as indicated by line 17—17 on Fig. 16.

Figure 18:
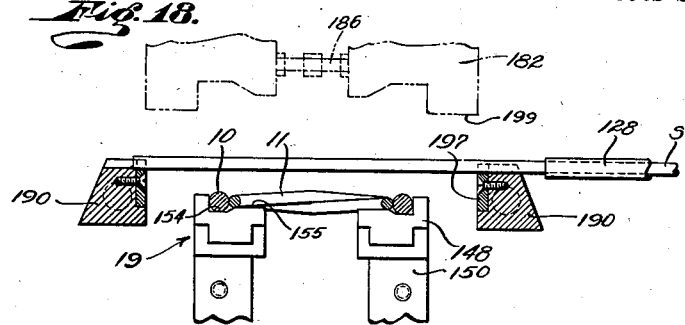

Fig. 18 is a diagrammatic view illustrating the relative positions of the parts immediately preceding the cutting off and initial shaping of the transverse frame member.

Figure 19:
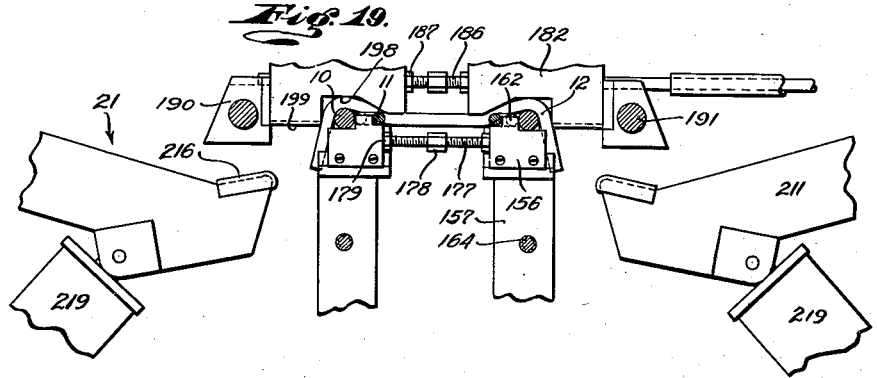

Fig. 19 is a view similar to Fig. 18 showing the transverse member cut off and initially shaped.

Figure 20:
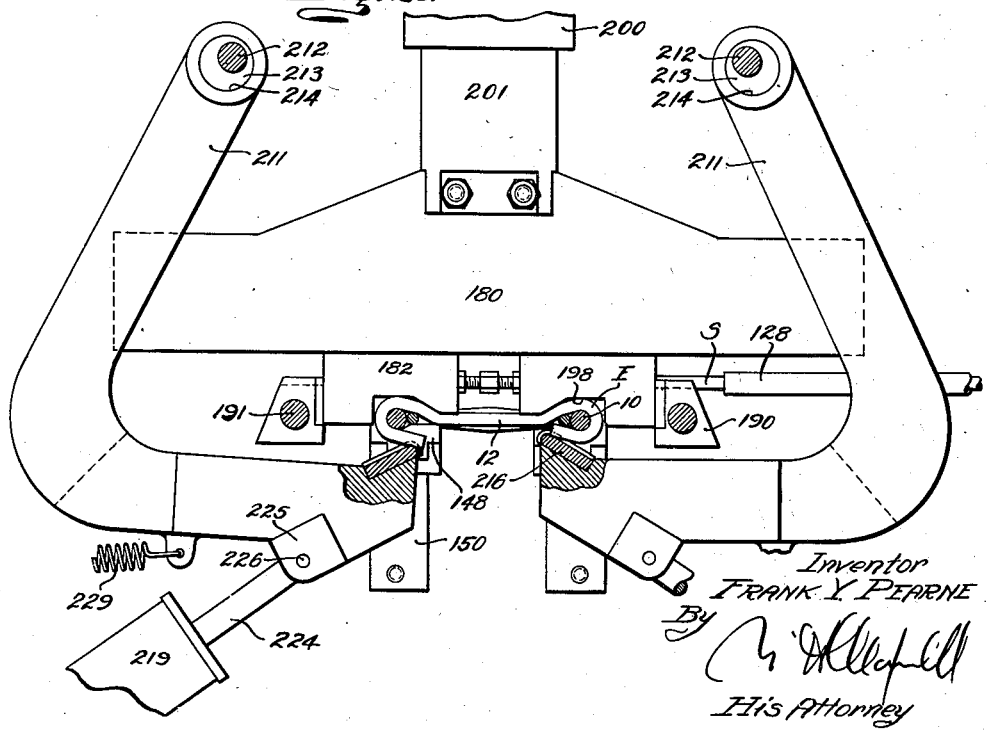

Fig. 20 is a diagrammatic view illustrating the action of the tying means in completing the ties.

Fig. 21 is a longitudinal detailed sectional view of one of the valves of the controls showing the valve in the closed condition.

Fig. 22 is a diagrammatic view illustrating the fluid pressure controls and actuating means.

Fig. 23 is a plan view of a portion of the frame fabricated by the machine.

The machine of the present invention is intended primarily to manufacture or fabricate steel frames useful as reinforcing elements or structural elements of building constructions. Fig. 23 illustrates a portion of a frame of the character fabricated or assembled by the machine. As illustrated this frame comprises two spaced substantially parallel longitudinal members 10, one or more brace members or diagonal members 11 and spaced transverse members 12. The several members of the frame are formed of stock of suitable shape or cross section. In the typical case illustrated the frame members 10, 11 and 12 are formed of round stock. The gauge or diameters of the stock of which the frame members are formed may be varied at will. In the case illustrated the longitudinal members 10 are of heavier gauge than the members 11 and 12. The brace members or diagonal members 11 are of zigzag shape, each having adjacent portions alternately pitched in opposite directions. The adjacent pitched portions of the diagonal members 11 are joined at angle bends 13. The bends 13 occur at the points of connection of the transverse members 12 with the longitudinal members 10.

The machine of the present invention may be said to comprise, generally, means 14 for feeding or advancing the longitudinal frame members 10; means 15 for advancing the brace or diagonal members 11; means 16 for shaping or bending the diagonal members 11 to have the bends 13; means 17 assisting in the bending of the diagonal members 11; means 18 for feeding or advancing the transverse members 12; a connection or tie forming unit A comprising anvil die means 19, means 20 for cutting off and initially bending the transverse frame members 12 and means 21 acting on the transverse members 12 to complete the ties between the members 10, 11 and 12, and fluid pressure actuating and control means 22.

The machine preferably includes a suitable supporting frame or bed 23 for carrying its several elements and mechanisms. The bed 23 is an elongate structure having longitudinal parts 23ª and transverse connecting parts 24. The longitudinal frame members 10 being fed to the tying unit A may rest on the transverse parts 24 of the outer or rear portion of the supporting bed 23. The longitudinal frame members 10 are advanced along the bed 23 in spaced substantially parallel relation by the means 14.

The means 14 includes a shiftable slide or carriage 25. The carriage 25 may be of inverted T-shape to have broad base flanges 26. The feeding carriage 25 is shiftable along a horizontal plate 27 secured to the upper side of the bed 23. The carriage 25 is guided for longitudinal movement on the plate 27 by spaced guides 28. The guides 28 engage over the edge portions of the flanges 26 to retain the carriage 25 on the plate 27. Substantially horizontal brackets 29 project from the opposite sides of the carriage 25. The longitudinal members 10 pass above the brackets 29 and are spaced at opposite sides of the central vertical axis of the carriage 25.

The means 14 operates to intermittently simultaneously advance the two frame members 10 toward the unit A and includes a pair of come-along units 30 for engaging the members 10 to advance the same and a pair of similar come-along units 31 for engaging the members 10 to hold the same against movement. The come-along units 30 are secured to the brackets 29 on the carriage 25 for horizontal adjustment toward and away from one another. Screws 9 on the units 30 may pass through slots 29ª in the brackets 29 to provide for this adjustment. The holding come-along units 31 are adjustably secured to brackets 32 fixed to the bed 23. The units 31 carry screws 8 received in horizontal slots 32ª in the brackets 32.

Figure 3:
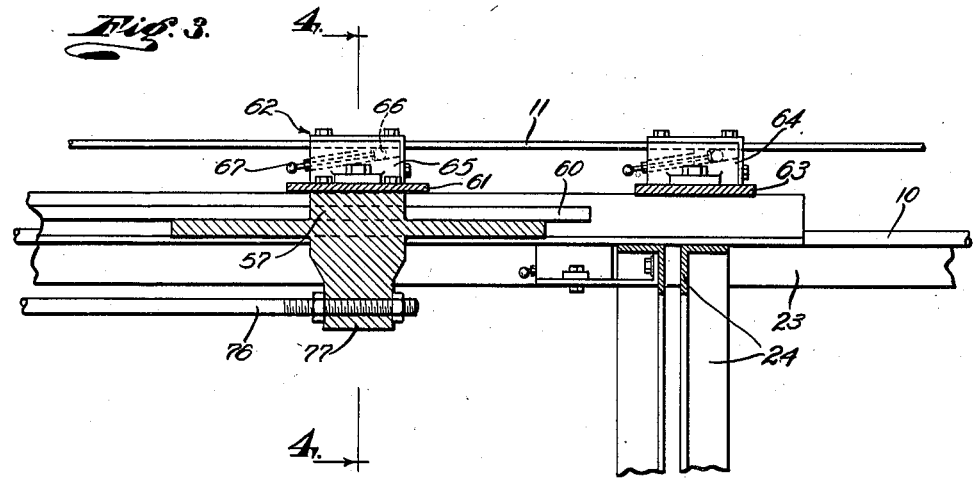
Fig. 3 is an enlarged fragmentary vertical detailed sectional view taken as indicated by line 3—3 on Fig. 1.
Figure 4:
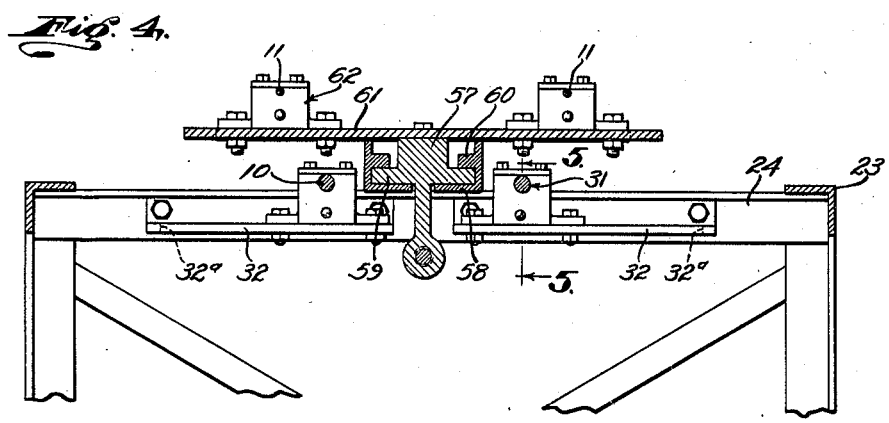
Fig. 4 is a fragmentary vertical detailed sectional view taken as indicated by line 4—4 on Fig. 3.
Figure 5:
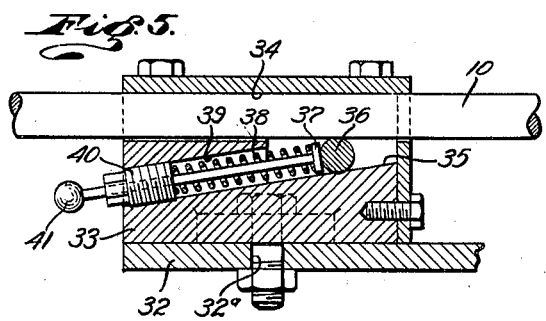
Fig. 5 is an enlarged vertical detailed sectional view of one of the come-along units taken as indicated by line 5—5 on Fig. 4.

The come-along units 30 and 31 may be of any suitable or selected type and construction. In Fig. 5 of the drawings I have illustrated one of the units 31 in detail and will proceed with a description of the same, it being understood that the other unit 31 and that the units 32 may be similar to or identical with the unit 31 illustrated.

The come-along unit 31 comprises a body 33 provided with a horizontal opening 34 freely passing one of the frame members 10. An inclined wall 35 on the interior of the body 33 merges with the opening 34 and a roller 36 is shiftably supported on the wall 35 to cooperate with the member 10. A plunger 37 bears against the roller 36 and a spring 38 presses against the plunger 37 to force the same against the member 10. The spring 38 is received in an inclined opening 39 in the body 33 and the outer end of the spring bears against a threaded plug 40 threaded in the inclined opening. A stem 41 is attached to the plunger 37 and extends outwardly through an opening in the plug 40 to be manually engaged for the purpose of retracting the plunger and allowing the release of the roller 36 from the member 10.

The come-along units 30 on the carriage 25 operate to grip the frame members 10 when the carriage moves toward the unit A so that the members 10 are advanced toward the unit A. The units 31 secured to the stationary bed 22 operate to grip the members 10 during the return stroke of the carriage 25 to hold the members 10 against movement.

The means 14 for intermittently advancing the longitudinal members 10 of the frame further includes a cylinder and piston means for reciprocating or operating the carriage 25. A cylinder 45 is arranged in longitudinal alignment with the carriage 25 and is bolted or otherwise fixed to the plate 27. A piston 46 is operable in the cylinder 45 and has a rod 47 projecting from the forward end of the cylinder toward the carriage 25. A gland 48 on the forward head or end of the cylinder 45 seals and packs about the piston rod 47. A yoke 49 on the forward end of the piston rod 47 is bolted or pinned to the carriage 25 to secure the rod to the carriage. The actuating and control means 22 supplies fluid under pressure to the opposite ends of the cylinder 45 to reciprocate the carriage 25, as will be subsequently described. A stop screw 50 on the plate 27 is engageable by the carriage 25 to limit the forward movement of the carriage and the piston 46 is cooperable with the rear end of the cylinder 45 to limit the return movement of the carriage. It is believed that it will be apparent how the means 14 is operable to simultaneously advance the two longitudinal frame members 10 a given distance each operation and how the means operates to return for a succeeding advancement of the frame members 10.

The means 15 for advancing or feeding the diagonal frame members 11 is operable to simultaneously intermittently advance two members 11 coincidentally with the advancement of the longitudinal frame members 10. The feed means 15 is adapted to receive the stock for the diagonal frame members 11 from spools or reels 51. The stock for the members 11 is reeled or wound on the reels 51. The reels 51 are rotatably supported by suitable bearings 52 on supporting posts 53. The posts 53 are arranged at one side of the bed 23 adjacent the outer or rear end of the bed. The stock for the two diagonal frame members 11 extends from the reels 51 to the upper side of the bed 23 and is guided by pairs of rollers 54 rotatably supported on the bed. Spaced longitudinally arranged plates 55 are fixed on the upper side of the bed 23 and two rows of rollers 56 are provided on each plate 55. The rollers 56 are freely rotatable and are grooved or shaped to receive the diagonal frame members 11. The stock for the members 11 extends from the rollers 54 and is trained between the rows of rollers 56 which operate to straighten out the stock so that it constitutes the members 11 for the frame. The rollers 56 of the adjacent rows are offset to effectively remove the bends or curvatures from the members 11.

The means 15 for feeding or advancing the diagonal frame members 11 further includes a shiftable or reciprocable carriage 57. A pair of opposed angle irons 58 is secured to the upper side of the supporting bed 23 to form a track for the carriage 57. The carriage 57 has flanges 59 riding on the lower flanges of the angle irons 58 and the upstanding flanges of the angle irons 58 have cleats 60 engageable by the upper sides of the flanges 59 to hold the carriage 57 against upward movement. A transversely disposed horizontal plate 61 is secured to the upper side of the carriage 57 and projects laterally beyond the angle irons 58. A pair of spaced come-along units 62 is secured to the upper side of the plate 61 and the units 62 cooperate with the spaced frame members 11 to advance the same.

A horizontal plate 63 is secured to the upper sides of the angle irons 58 adjacent the rear ends of the angle irons and carries a pair of spaced stationary come-along units 64. The come-along units 62 and 64 may be similar to the above-described come-along units 33 each having a body 65, a roller 66 adapted to grip a frame member 11, and a spring-urged manually retractable plunger 67 for urging the roller 66 against the frame member 11. Upon movement of the carriage 57 toward the unit A the come-along units 62 grip the frame members 11 to advance the same toward the unit A. Upon the return or rearward movement of the carriage 57 the come-along units 64 grip the frame members 11 to hold the same against rearward movement. It will be observed that the frame members 11 handled as above described occupy a plane or planes spaced above the plane occupied by the longitudinal frame members 10.

The means 15 for advancing the diagonal frame members 11 is operable by the means 14 through the medium of a differential mechanism to intermittently simultaneously advance the two diagonal members 11. A horizontal platform 68 is supported on the plate 27 by longitudinally spaced brackets 69. The platform 68 has its forward portion above the cylinder 45 and the platform extends rearwardly beyond the cylinder 45. Spaced opposed angle irons 70 are fixed to the upper side of the platform 68 and a pair of independently shiftable racks 71 and 72 is arranged between the angle irons 70. The racks 71 and 72 are guided for independent longitudinal movement by the angle irons 70 and by engagement with one another. The upper sides of the racks 71 and 72 are provided with series of gear teeth. The rack 71 is thicker than the rack 72 to project above the rack 72.

A rod 73 is secured to the forward end of the rack 71 and extends forwardly to the shiftable carriage 25 of the means 14. The rack rod 73 passes through an opening in a lateral wing 74 on the carriage 25 and has spaced adjustable nuts 75 engageable with the opposite sides of the wing 74. This construction forms a slack connection between the carriage 25 and the rack 71, the purpose of which will be subsequently described. A rod 76 is secured to the rack 72 and extends rearwardly therefrom to the carriage 57. The rod 76 is fixed to a tail 77 on the carriage 57 to connect the rack 72 with the carriage 57.

One pair of the above described brackets 69 has inwardly projecting bearings 78 rotatably supporting a horizontal shaft 79. Pinions 80 and 81 are fixed to the shaft 79. The pinion 80 meshes with the rack 71 and the pinion 81 meshes with the rack 72 so that the rod 76 and the carriage 57 are moved by or with the carriage 25 through the medium of the rack and pinion drive 71-72-80-81. The pinion 81 is larger in diameter than the pinion 80 to have a greater peripheral speed than the pinion 80 so that the rack 72 moves a greater distance than the rack 71 when the carriage 75 is moved or reciprocated as described above. The differential pinion and rack drive accordingly provides for an advancing stroke of the carriage 57 and the members 11 longer than the advancing stroke of the carriage 25 and the members 10. The diagonal frame members 11 are advanced a greater distance than the members 10 to provide for or compensate for the difference in the lengths of the members in the finished frame, which difference results from the zigzag shape of the members 11, the members 10 being unbent or straight.

The above described slack connection between the rack rod 73 and the carriage 25 is adjustable to provide for a variation in the differential of the advancing movements of the frame members 10 and 11 so that the machine is suitable for the fabrication of the frames of different widths and of frames having diagonal members with bends 13 of different angularities. The slack connection between the rack rod 73 and the advancing carriage 25 may be adjusted to provide for any selected initial advancing movement of the frame members 10 independently of and prior to the advancement of the frame members 11. By changing the amount of this initial independent movement of the frame members 10 the ultimate extents of advancement strokes of the members 10 and 11 may be related, as necessary. The rack and pinion drive between the carriage 25 and the carriage 57 has a given or known speed change and the carriage 25 has a given stroke. The adjustable slack connection between the rack rod 73 and the carriage 25 may be adjusted so that the members 11 are given an advancing movement of the required length with each advancing movement of the members 10 to bring their bends 13 in the proper place in the frame. It is to be noted that the cylinder and piston mechanism 45—46 operates the means 15 for advancing the frame members 11 as well as the means 14 for advancing the frame members 10.

The means 16 is operable by the control and actuating means 21 to bend or shape the diagonal members 11 to have the bends 13 and the adjacent portions pitched in opposite directions as illustrated in Fig. 23. The bending means 16 includes a carriage 78 carried and guided by the tracks 28 described above (see Fig. 9). The carriage 78 of the bending means 16 is spaced rearwardly from the unit A relative to the direction of advancement of the frame members 10 and 11. The carriage 78 is provided with a plate 79 adapted to clamp up against the under surfaces of the tracks 28. Screws 80 connect the plate 79 with the carriage 78 and are operable to clamp the plate 79 against the tracks 28 to lock the carriage 78 in the adjusted position. When the screws 80 are loosened the carriage 78 may be adjusted along the tracks 28 to have the bending means 16 form the bends 13 at selected or required positions along the members 11.

The carriage 78 projects upwardly and has a lateral flange 81 on its upper end. A shelf 82 of channel iron, or the like, is fixed to the flange 81. The shelf 82 is horizontal and is arranged transversely of the bed 23 and the tracks 28. The parts are related and proportioned so that the longitudinal members 10 and the diagonal members 11 pass above the shelf 82 in spaced relation thereto. A pair of spaced upwardly projecting posts 83 is provided on each side or longitudinal edge of the shelf 82. Two guide rods 84 extend between and are secured to the posts 83 at each edge of the shelf 82 and are spaced apart vertically by spacing blocks 85. The diagonal frame members 11 pass between the spaced guide rods 84. The spaced sets of guide rods 84 hold the diagonal frame members 11 against vertical displacement and retain the members in position for bending by the dies of the means 16.

The means 16 for bending the frame members 11 further includes what I will term an anvil die 86 and two bending dies 87. The anvil die 86 is shiftable vertically into and out of the horizontal plane occupied by the members 11, as held and guided by the guide rods 84. A vertical cylinder 88 is provided in the carriage 78 and a piston 89 operates in the cylinder 88 and projects from the upper end of the carriage. The piston 89 projects beyond the upper side of the shelf 82 and the anvil die 86 is secured to a flange 90 on the upper end of the piston. It is preferred to removably attach the anvil die 86 to the piston 89. As illustrated, screws 91 may serve to removably attach the die 86 to the piston 89. The piston 89 may have a centering post 92 received in an opening 93 in the die 86 to center and position the die. The control and actuating means 22 supplies fluid under pressure to the lower end of the cylinder 88 as will be subsequently described to elevate the die 86 to the plane of the frame members 11. The die 86 is adapted to pass upwardly between the spaced frame members 11 when the piston 89 is actuated.

Spring means are provided for returning the die 86 at the completion of each bending operation to a down or retracted position where it does not interfere with the advancement of the frame members 11. Downwardly projecting studs 94 are provided on the flange 90 and pass through openings in the shelf 82. Springs 95 are attached to the lower ends of the studs 94 and are connected with the carriage 78 to return the piston 89 and the die 86 following each bending operation. The heads 96 on the lower ends of the studs 94 may cooperate with the under side of the shelf 82 to limit the upward travel of the piston 89 and to locate the die 86 in position for the bending operation. The opposite ends of the die 86 facing toward the spaced frame members 11 have outwardly converging active faces 97. The angle between the faces 97 is substantially the same as that at the inner sides of the bends 13 in the finished or bent frame members 11.

The bending dies 87 are movable horizontally toward and away from the active ends of the anvil die 86 by cylinder and piston units. Each of these cylinder and piston units includes a cylinder 98 secured to the shelf 82 and a piston 99 operable in the cylinder. The cylinders 98 are arranged in aligned relation at opposite sides of the pair of spaced frame members 11 and are adjustable toward and away from one another so that the machine may form frames of different widths. Aligned slots 100 are provided in the shelf 82 and bolts 101 pass through the slots 100 to secure the cylinders 98 to the shelf 82. When the bolts 101 are loosened the cylinders 98 may be shifted or adjusted to have the dies 87 in the proper relation to the spaced frame members 11. The inner heads of the cylinders 98 have inwardly projecting flanges 102. There are two spaced flanges 102 on the inner head of each cylinder 98 and the spaced flanges have opposing guideways 103.

The bending dies 87 are horizontally disposed plate-like members and their opposite edge portions are slidably received in the guideways 103. The bending dies 87 are attached to rods 104 extending forwardly from the pistons 99 to be actuated by the pistons. The guideways 103 maintain the dies 87 in a horizontal plane for correct engagement with the diagonal frame members 11. The inner or active ends of the dies 87 have inwardly diverging active faces 105 pitched at substantially the same angle as the active faces 97 of the anvil die 86. The control means 22 supplies fluid under pressure to the outer ends of the cylinders 98 to force the dies 87 inwardly into bending cooperation with the diagonal frame members 11. The inwardly moving dies 87 bend the members 11 into conformity to the end faces 97 of the anvil die 86 and thus provide the frame members with the bends 13 and the adjacent pitched portions. It will be seen that the trailing portions or unbent portions of the frame members 11 are made to cross one another when the dies 87 are operated to form the bends 13. For this reason the trailing or unbent portions of the members 11 occupy different horizontal planes to pass one over the other. Springs 106 operate to return the dies 87 to their retracted positions following each bending operation. The springs 106 may be connected to the posts 107 on the dies 87 and to the inner heads of the cylinders 98.

The means 17 acts on the trailing or unbent portions of the diagonal frame members 11 to cross the same and to assist the means 16 in bending the members 11 when the means 16 is operated. The means 17 is in the nature of a cylinder and piston mechanism comprising two cylinders 108 and pistons 109 operable in the cylinders. The cylinders 108 are arranged in spaced parallel relation one above the other and have their longitudinal axis transverse of the supporting bed 23 and the members 11. The means 17 is spaced behind the bending means 16 relative to the direction of advancement of the frame members 10 and 11. The cylinders 108 of the means 17 may be supported on the bed 23 by suitable brackets 110. The cylinders 108 are supported to be spaced above the tracks 28, the carriage 25, etc., and are located so that the frame members 11 pass between them. Rods 111 are attached to the pistons 109 and extend from the cylinders 108. The cylinders 108 preferably have finished external surfaces and bearing-like slides 112 are shiftable longitudinally on the cylinders. The rods 111 have cross heads 113 on their outer ends and two spaced rods 114 extend inwardly from each cross head 113. The rods 114 are attached to the slides 112 of the related cylinders 108. The rods 114 connect the slides 112 with the piston rods 111 and pistons 109 to be operated thereby.

One slide 112 has a depending loop 115 receiving a diagonal frame member and the other slide 112 has an upwardly projecting loop 115 receiving the other member 11. The loops 115 on the slides 112 cooperate with the members 11 to cause the members to move with the slides. The cylinder and piston units of the means 17 are related so that the piston rod 111 of one unit is fully extended when the piston rod 111 of the other unit is fully retracted. The means 22 supplies fluid under pressure to the opposite ends of the cylinders 108 and thus operates to reverse the positions of the pistons 109 concurrently with or following the operation of the bending means 16 so that the loops 115 cooperating with the frame members 11 move or assist in moving the members across one another as the bends 13 are formed. At each operation of the bending means 16 the means 17 operates to cross the frame members 11 one over the other in conformity to the bends 13 made in the members.

The invention includes means for maintaining the diagonal members 11 in spaced horizontal planes for engagement by the means 17 just described. Two longitudinally spaced guide units or assemblies B are provided to guide the frame members 11. Each guide assembly B includes two spaced posts 116 and three vertically spaced horizontal guide rods 117 extending between the posts 116. The guide rods 117 extend transversely of the bed 23 and are positioned so that one member 11 passes between the upper and middle rod 117 and the other member 11 passes between the middle and lower rods 117. One guide assembly is positioned adjacent the means 17 and its posts 116 may be secured to the brackets 110 by bolts 118. The other guide assembly B is spaced rearwardly from the means 17 and is suitably mounted on the bed 23. The spaced guide assemblies B are of sufficient transverse extent or length to allow for the free criss-crossing of the members 11 by the means 16 and 17.

The means 18 is provided to intermittently feed material or stock S to the tie forming unit A to form the transverse members 12 of the frame. The feeding means 18 is located adjacent and at one side of the forward end of the bed 23 to be in transverse alignment with the unit A. The means 18 may include a suitable frame or bed 119 and a horizontal top plate 120 on the bed. A reel 121 carries a supply of the stock S and is rotatably supported on a post 122 adjacent the outer end of the bed 119. The stock S passes from the reel 121 across the top of the plate 120 toward the unit A. A series of guiding and straightening rollers 123 is provided on the plate 120 to straighten the stock S as it passes from the reel 121. Spaced horizontal guides 124 are provided on the bed 119 and a carriage 125 is supported by the guides 124 for horizontal movement toward and away from the unit A. A come-along unit 126 is secured to the carriage 125 and cooperates with the stock S for the purpose of advancing it toward the unit A. A stationary come-along unit 127 is secured to the plate 120 and has cooperation with the stock S. The units 126 and 127 may be similar to or identical with the units 31 described in detail above. A guide tube 128 may extend from the unit 127 toward the tie-forming unit A.

The means for shifting or operating the carriage 125 of the means 18 comprises a cylinder 129 secured in the bed 119 and a piston 130 operable in the cylinder. A piston rod 131 is connected with the piston 130 and extends from one end of the cylinder 129. The rod 131 is secured to the carriage 125 by nuts 132 so that the carriage is operable by the piston 130. The control and actuating means 22 supplies fluid under pressure to the opposite ends of the cylinder 129 to reciprocate the carriage 125 so that the means 18 intermittently feeds or advances a predetermined amount of the stock S to the unit A. An adjustable stop 133 is connected with the guides 124 to limit the stroke of the carriage 125. Pins 134 may be employed to secure the stop 133 in adjusted position to provide for the advancement of the stock S a selected distance each actuation of the means 18. The means 18 is operable by and under the control of the means 22 to intermittently feed the stock S for the members 12 to the unit A in correct synchronism with the other elements of the machine, as will be hereinafter described.

The unit A is the tie or the connection forming unit of the machine operating to bend the opposite end portions of the transverse members 12 about the longitudinal members 10 at the bends 13 to secure the several members 10, 11 and 12 together for subsequent welding and to constitute an integral frame structure. The unit A is positioned at the forward end of the supporting bed 23. In the preferred construction the unit A includes a base 135 having a rib 136 on its upper side. An elongate horizontal slot 137 is provided in the rib 136. A pair of vertically disposed complementary right and left hand plates 138 is arranged at each side of the rib 136. The lower edges of the plates 138 ride on the base 135 and the inner sides of the plates engage against the rib 136. Bolts 139 pass through openings in the plates 138 and extend through the slot 137 to connect the plates at the opposite sides of the rib and to hold the plates clamped against the rib. When the bolts 139 are loosened the plates 138 may be adjusted to vary the spacing between the inner opposing edges of the plates occupying the same vertical planes. This adjustment may adapt the machine for the handling of frames of different widths.

Bolts 140 and other connecting parts to be hereinafter described serve to connect the sets or pairs of opposing parallel plates 138 for simultaneous adjustment.

Screw means is provided for adjusting the sets or pairs of right and left hand plates 138 toward and away from one another. A horizontally disposed screw 141 is arranged between the lower portions of the plates 138 in parallel relation to the base rib 136. The intermediate portion of the screw 141 may be rotatably supported by a suitable bearing 142 on the rib 136 and a similar bearing 143 may rotatably carry one end portion of the screw. Nuts 144 are connected to and mounted between the sets or spaced parallel right and left hand plates 138. Studs or trunnions 145 project from opposite sides of the nuts 144 to pass through openings in the plates 138 and nuts 146 are threaded on the outer ends of the studs to engage against the outer sides of the plates. The screw 141 is threaded through the nuts 144. One end portion of the screw 141 carries a right hand thread and the other end portion of the screw 141 carries a left hand thread. A suitable hand wheel 147 is secured to the end of the screw 141 adjacent the bearing 143. The screw 141 has shouldered engagement with one end of the bearing 143 and the wheel 147 has engagement against the other end of the bearing 143 so that the screw is held against longitudinal movement. When the bolts 139 are loosened the screw 141 may be rotated by means of the hand wheel 147 to adjust the sets or pairs of right and left hand plates 138 toward or away from one another to vary the spacing between the opposing inner edges of the plates.

The anvil die means 19 is embodied in the unit A to support the longitudinal frame members 10 and the diagonal frame members 11 during the formation of the connections or ties of the frame. The means 19 includes a stationary anvil die 148 secured to each rear plate 138, that is, to each plate 138 that faces the bed 23 and that is in trailing relation to the advancing frame. The plates 138 have notches 149 in their inner edges and die plates 150 are secured to the plates 138 to project upwardly to the notches 149. The die plates 150 have heads 151 of increased thickness and the stationary anvil dies 148 have tongue and groove connections 152 with the heads 151 and set screws 153 are provided to lock the dies in place. The upper active faces of the stationary anvil dies have notches 154 and flat horizontal faces 155 extending inwardly from the notches 154 to the inner sides of the dies. The notches 154 are adapted to receive the lower portions of the longitudinal frame members 10 and portions of the diagonal frame members 11 rest on the faces 155. The rear or outer walls of the notches 154 are of substantial height to serve as retaining abutments for the frame members 10. The outer walls of the notches 154 operate to prevent outward or lateral movement of the frame members 10.

The anvil die means 19 further includes movable anvil dies 156 associated with the front or forward plates 138. Die carrying plates 157 are arranged against the rear or inner sides of the forward plates 138 to carry the movable anvil dies 156. The plates 157 have thickened heads and the dies 156 are secured to these heads by tongue and groove connections 158. The dies 156 are adjustable on the heads of the plates 157 and set screws 159 are provided to lock the dies in the adjusted positions. The upper active faces of the dies 156 have notches 160 for receiving the longitudinal frame members 10 and flat faces 161 extending inwardly from the notches 160 to receive or support the diagonal frame members 11. Substantially triangular bosses 162 project upwardly from the faces 161 at the inner walls of the notches 160. As best illustrated in Fig. 17 of the drawings the bosses 162 project upwardly between the longitudinal frame members 10 and the angular portions of the diagonal members 11. The bosses 162 are engageable by the frame members 10 to prevent them from shifting inwardly toward one another. In accordance with the invention the carrier plates 157 are shiftable vertically whereby the dies 156 may be moved into and out of their active positions. Spaced vertical slots 163 are provided in each front plate 138 and the plates 157 have studs 164 extending outwardly through the slots 163. The studs 164 guide the plates 157 for vertical movement. Nuts 165 are provided on the outer ends of the studs 164 to retain the die carrying plates 157 in engagement with the inner sides of the plates 138.

The anvil die means 19 further includes a cylinder and piston mechanism for shifting the dies 156 to their active positions. Channel irons 166 are secured to the inner sides of the opposing parallel plates 138 above the base 135 and carry a vertically disposed cylinder 167. The studs 145 pass through horizontal slots 168 in the channel irons 166 to permit adjustment of the sets or pairs of plates 138 relative to one another. The studs 145 may serve to secure the angle irons 166 to the plates 138. A piston 169 operates in the cylinder 167 and has a rod 170 projecting from the upper end of the cylinder. A cross head 171 is secured to the projecting upper end of the piston rod 170. The cross head 171 is of sufficient width to have engagement with the inner sides of the spaced parallel plates 138 to be guided by the plates. The cross head 171 engages upwardly against the lower ends of the carrier plates 157 of the dies 156 and when the piston 169 is moved upwardly the cross head cooperating with the plates 157 moves the dies 156 up to their active work-engaging positions. The cross head 171 is of sufficient length to cooperate with the lower ends of the plates 157 throughout the range of adjustment of the unit A. The control and octuating means 22 admits fluid under pressure to the lower end of the cylinder 167 to raise the dies 156 in the manner described above.

Adjustable means is provided for limiting the upward movement of the piston 169 and the dies 156. Upwardly extending rods 172 are secured to the lower end or head of the cylinder 167 and extend upwardly at opposite sides of the cylinder. A transverse or horizontal stop bar 173 has openings receiving the upper portions of the rods 172. The bar 173 is adjustably connected with the rods 172 by nuts 174 threaded on the rods. The bar 173 is engageable by the cross head 171 to limit the upward travel of the piston 169 and thereby limit the upward movement of the anvil dies 156. By adjusting the bar 173 vertically the die elevating means may be regulated to position the dies 156 for cooperation with frame members 10 and 11 of different diameters or gauges.

Spring means is provided for returning the dies 156 to their retracted positions at the completion of the bending and tying operations. Extensible helical springs 175 are secured to the lower studs 164 and have their lower ends anchored to studs 176 on the plates 138. The springs 175 are extended when the dies 156 are raised and when the fluid pressure is removed from below the piston 169 the springs 175 return the dies to their retracted positions. The anvil dies 156 are retracted to positions below the plane of the frame being fabricated by the machine to permit the free advancement of the frame at the completion of each tying operation.

The shiftable anvil dies 156 are connected for simultaneous movement and for accurate transverse adjustment. A double ended screw 177 extends horizontally between the spaced anvil dies 156 and has its opposite ends threaded in openings in the opposing sides of the dies. The screw 177 has a right hand thread on one end portion and a left hand thread on the opposite end portion. A polygonal part 178 is provided on the screw 177 between its threads to be engaged by a wrench or the like for turning the screw. Lock nuts 179 are threaded on the screw 177 and are adapted to clamp against the dies 156 to lock the dies in the adjusted position. When the set screws 159 and the nuts 179 are loosened the screw 177 may be rotated to adjust the dies 156 toward or away from one another to bring them to positions where they have correct engagement with the "work" or frame members.

The means 20 operates to cut the stock S as it is fed to the unit A to form the transverse frame members 12 and operates to initially bend the members 12 and clamp them in place for the final bending and tying operations. The means 20 includes an elongate horizontally disposed cross head 180 arranged between the plates 138 above the anvil die means 19. The cross head 180 is shiftable vertically toward and away from the anvil dies 148 and 156. The lower edge of the cross head 180 has a longitudinal groove 181. The means 20 further includes a pair of dies 182 carried by the cross head 180. The dies 182 are spaced apart longitudinally of the cross head 180 and occupy a vertical plane spaced between the planes occupied by the pairs of anvil dies 148 and 156. The dies 182 have tongues 183 received in the groove 181. Set screws 184 are threaded through openings in the cross head 180 and cooperate with grooves 185 in the tongues 183 to lock the dies 182 in place.

Means is provided for adjusting the dies 182 toward and away from one another to have cooperation with transverse frame members 12 of different lengths. A double ended screw 186 has its opposite end portions threaded in the dies 182. One end part of the screw 186 has a right hand thread and the other end of the screw has a left hand thread. Lock nuts 187 are threaded on the screw 186 and are adapted to engage the dies 182 to lock the same in adjusted position. When the set screws 184 and the nuts 187 are loosened the screw 186 may be turned to adjust the dies 182 toward or away from one another to the correct positions. The lock nuts 187 and the set screws 184 are then tightened down to set the dies 182 in place.

The stock S when fed into the unit A lies transversely across the frame members 10 and 11 and is spaced above the frame members. Upon downward movement of the dies 182 toward the anvil dies 148 and 156 the dies 182 act as shearing elements or knives to cut the stock S at two spaced points to provide a transverse frame member 12. The lower ends of the dies 182 have grooves 188 for receiving the stock S when the dies move downwardly and knives 189 of hard material are secured to the outer ends of the dies 182 to have shearing engagement with the stock S. Shear blocks 190 are arranged between the opposing parallel plates 138 to form stationary shear elements for the cutting off of the members 12. Studs 191 project from the opposite ends of the blocks 190 and are received in inclined slots 192 in the plates 138. Nuts 193 are threaded on the opposite ends of the studs 191 to clamp against the outer sides of the plates 138 and clamp the blocks in adjusted positions. When the nuts 193 are loosened the blocks 190 may be adjusted to bring the blocks 190 in correct relation to the vertically shiftable dies 182 and to bring the blocks in position to have proper supporting engagement with stock S of different gauge. Screws 194 are threaded through lugs 195 on the inner sides of the plates 138 and clamp against the blocks 190 to hold the blocks against turning and tipping. Grooves 196 are provided in the upper sides of the blocks 190 to receive the stock S as it is fed into the unit A by the means 18. Knives 197 are provided on the inner sides of the blocks 190. The inner faces of the knives 197 are in substantially the same vertical plane as the outer faces of the knives 189.

When the means 18 feeds the stock S into the unit A the stock rests in the grooves 196 of the blocks 190 to be clear of the anvil dies 148 and 156 and when the dies 182 move downwardly the knives 189 and 197 shear off or cut the stock S. The stock S is fed inwardly a sufficient extent to have a short outer end part cut off during the above operation. The stock S is cut off at two longitudinally spaced points, as described above, to assure a balance of the forces on the means 20 and to assure the correct length of the members 12.

The lower ends of the dies 182 are shaped to give the transverse members 12 their initial shape or bends and to clamp the members 12 tightly against the members 10 and 11 for the final tying operations. A notch 198 is provided in the lower face of each die 182. The outer walls of the notches 198 are vertical and of substantial extent. These vertical outer walls of the notches 198 lie in planes slightly offset from the planes occupied by the outer ends of the anvil dies 148 and 156. The inner walls of the notches 198 slope downwardly and inwardly relative to the central vertical axis of the unit A. Flat substantially horizontal faces 199 extend from the inclined inner walls of the notches 198 to the inner ends of the dies 182. When the dies 182 move downwardly the stock S is received in the grooves 188 and 196 and the stock is cut off as described above to form a member 12. As the downward movement of the dies 182 is continued the member 12 is brought down against the frame members 10 supported on the anvil dies 148 and 156. The grooves 188 cooperating with the end portions of the member 12 bend these portions downwardly and as this bending continues the corners occurring at the points of joinder of the grooves 188 and the notches 198 bear against the member 12 to bend its end parts downwardly and inwardly to slightly inclined positions. The inner faces 199 of the dies 182 force the intermediate portion of the member 12 downwardly and cause the member to bend in substantial conformity to the inclined walls of the notches 198. The intermediate portion of the transverse member 12 is bent or forced downwardly so that it remains substantially straight and occupies substantially the same horizontal plane as the diagonal members 11. The bending of the end portions of the member 12 downwardly and inwardly, as above described, causes the member 12 to curve about the upper portions of the longitudinal frame members 10 and the parts of the member 12 bent by the inclined walls of the notches 198 are clamped tightly against the bends 13 to hold the members 11 out against the members 10. Fig. 19 illustrates the condition of a transverse member 12 at the completion of the down stroke of the pair of dies 182.

It is to be understood that the stock S for the member 12 is received between the plates 138 in a plane spaced between the vertical planes occupied by the spaced sets of anvil dies 148 and 156. The dies 182 occupy substantially the same vertical plane as the stock S and following the cutting off of the transverse member 12 operate to bend its end portions downwardly and inwardly between the spaced sets of anvil dies 148 and 156. The dies 182 remain in tight cooperation with the transverse member 12 to clamp the frame against the anvil dies 148 and 156 for the final bending and tie forming operations.

The means 20 includes a cylinder 200 and a ram or piston 201 operable in the cylinder for forcing the dies 182 downwardly. The cylinder 200 is vertically disposed between the upper portions of the front and rear plates 138 and is attached to horizontal channel irons 202. Spacer blocks 203 are arranged against the inner sides of the plates 138 and the channel irons 202 engage against the blocks. Bolts 204 pass through horizontal openings in the plates 138 and the blocks 203 and extend through horizontal slots 205 in the channel irons 202. When the pairs of spaced parallel plates 138 are to be adjusted toward or away from one another to adapt the unit A for the handling of frames of different widths the bolts 204 are loosened so that the channel irons 202 do not interfere with the adjustment operations. The piston 201 extends downwardly from the lower end of the cylinder 200 and its lower end is attached to the cross head 180 by bolts 206. The control and actuating means 22 supplies fluid under pressure to the upper end of the cylinder 200 to force the cross head 180 and the dies 182 downwardly for the cutting and initial bending operations described above.

Spring means is provided for returning the ram 201 and the dies 182 to their retracted up positions. A plate 207 is attached to the head of the cylinder 200 and extensible return springs 208 have their upper ends attached to the plate 207 by hooks 209. Hooks 210 connect the lower ends of the springs 208 with the cross head 180. When the fluid pressure is removed from the upper end of the cylinder 200 the springs 208 operate to automatically return the cross head 180 and the dies 182 to normal positions such as shown in Fig. 13.

The means 21 operates to complete the bending of the end portions of the transverse members 12 to form tight ties between the transverse members and the frame members 10 and 11. The means 21 includes a swinging or pivoted arm 211 between each pair of front and back plates 138. Each arm 211 has a downwardly and outwardly inclined upper part and a downwardly and inwardly inclined lower part. The upper parts of the arms 211 are bifurcated to pass the opposite end portions of the cross head 180. The lower portions of the arms 211 may be solid and of reduced thickness. The upper ends of the arms 211 are pivotally supported between the spaced parallel plates 138. Pivot pins 212 have their opposite end portions turnable in openings in the plates 138. The intermediate portions 213 of the pins 212 are eccentric and are received in openings 214 in the upper parts of the arms 211. Nuts 215 are threaded on the opposite end portions of the pins 212 and are engageable with the outer sides of the plates 138 to clamp the eccentric pin portions 213 between the plates 138. By turning or adjusting the pin eccentrics 213 the active die parts on the arms 211 may be made to have correct engagement with the bent end portions of members 12 of different diameters or gauges.

Die parts 216 are secured to the lower parts of the arms 211. The die parts 216 are plate-like members facing upwardly. The inner edges or noses of the die parts 216 are preferably rounded and grooves 217 extend across the upper faces of the parts 16 and over their noses. The grooves 217 are adapted to have engagement with the bent end portions of the transverse members 12. The upper active faces of the die parts 216 are substantially tangent to the arcs of swinging or pivotal movement of the arms 211. When the arms 211 move inwardly the curved or rounded noses of the parts 216 engage the partially bent end portions of the transverse frame member 12 and bend them upwardly and inwardly to complete eyes E on the member 12. The movement of the arms 211 is such that the die parts 216 bend the end portions of the member 12 to tightly wrap about the longitudinal frame members 10 and to engage upwardly against the diagonal members 11 at their bends 13. The members 11 are gripped between the end parts of the transverse member 12 and the inclined parts of the member 12 bent downwardly by inclined walls of the notches 198. The die parts 216 pass upwardly between the spaced pairs of anvil dies 148 and 156. It is to be understood that the frame or work is clamped and held between the anvil dies 148 and 156 and the initial bending dies 182 during the completion of the tie eyes E, as described above.

Cylinder and piston means are provided for operating the arms 211 of the means 21. In the preferred form of the invention separate cylinder and piston units are provided for operating the individual arms 211. Each of these units includes a cylinder 219 and a piston 220 operating in the cylinder. The cylinders 219 have tongues 221 on their lower ends received between the up-turned lugs 222 on the outer edges of the spaced parallel plates 138. Pivot pins 223 extend through openings in the lugs 222 and the tongues 221 to pivotally secure the lower ends of the cylinders to the plates. Rods 224 are connected with the pistons 220 and extend from the upper ends of the cylinders 219. The piston rods 224 extend upwardly and inwardly toward the lower ends of the arms 211 and their projecting parts are received between the spaced lugs 225 on the arms. Pivot pins 226 pass through openings in the lugs 225 and the piston rods 224 to pivotally connect the rods with the arms 211. The control and actuating means 22 supplies fluid under pressure to the lower ends of the cylinders 219 to force the pistons 220 upwardly and thus swing the arms 211 inwardly.

Adjustable stop screws 227 are threaded through lugs on the arms 211 and are engageable with the outer edges of the aligned plates 138 to limit the inward swinging of the arms 211. Means are provided for returning the arms 211 after each operation of the final bending and tie forming means 21. Each rear supporting plate 138 has a bracket 228 projecting from its outer edge. Extensible helical springs 229 are connected between the arms 211 and the outer ends of the brackets 228. The springs 229 are operable to automatically return the arms 211 to their out or retracted positions when the fluid pressure is removed from behind the pistons 220.

The means 22 controls and actuates the several cylinder and piston units and mechanisms described above. The means 22 includes a pump 230, or the equivalent, for supplying or delivering fluid under pressure to the lines of the means 22. A tank 231 supplies fluid to the pump 230. A pipe 232 extends from the pump 230 to a master valve V and has two branches 233 communicating with the valve V at longitudinally spaced points. The valve V is in the nature of a manually operated balanced four-way valve. As diagrammatically illustrated in Fig. 22 the valve V may be a balanced piston valve. An operating lever 234 is provided to shift the piston or movable element of the valve V. The operation of the valve V will be hereinafter described. A pipe or line 235 extends from the valve V to the upper end of the cylinder 200 of the cutting and initial bending means 20. The line 235 has branches 236 and 237 communicating with the cylinders 88 and 167, respectively. The cylinders 219 of the means 21 are supplied with fluid under pressure by a line 238 connected with the line 235. In the particular arrangement illustrated the line 238 is connected with the branch 237 of the line 235.

The line 235 is provided with a pressure regulating valve 240 that opens when a given pressure builds up in the line 235 and its branches 236 and 237 following the actuation of the pistons 201, 169 and 89. In accordance with the broader aspects of the invention the valve 240 may be any suitable form of pressure relief valve or pressure regulating valve that is always open to flow in one direction in the line 238 and that opens to permit the flow in the other direction only after a predetermined pressure has built up in the line. Fig. 21 illustrates a valve 240 that may be employed in the fluid handling system of the apparatus, it being understood that the invention is not to be construed as limited to its employment.

The valve 240 illustrated in Fig. 21 includes a body 241 connected in the fluid handling system, for example, connected between the branch line 237 and the line 238. The body 241 has a passage 242 directly connecting the lines 237 and 238 which passage is controlled by a ball check 243. The ball check 243 prevents flow from the line 237 to the line 238 and allows a return flow in the opposite direction. A cylinder 244 is provided in the valve body 241 and ports 245 and 246 join the passage 242 at opposite sides of the ball check 243 and extend to the cylinder 244. The port 245 communicates with the inner end of the cylinder 244 while the port 246 joins the side of the cylinder 244 adjacent its inner end. A plunger 247 operates in the cylinder 244 and is adapted to cut off the port 246. A plug 248 closes the outer end of the cylinder 244 and a spring 249 is arranged under compression between the plug 248 and the plunger 247 to urge the plunger to its closed position. A part 250 of reduced diameter is provided on the inner end of the piston 247 and engages the inner wall of the cylinder 244 to close the port 245. The port 245 is smaller in diameter than the cylinder 244. The valve part 250 is considerably smaller in diameter than the remainder of the plunger 247.

The spring 249 normally holds the plunger 247 in the position where the part 250 closes the port 245 to prevent the flow of fluid under pressure from the branch line 237 to the line 238. When the pressure in the line 235 and the branch 237 builds up to a given value the pressure acting on the plunger part 250 exposed at the port 245 overcomes the spring 249 and moves the plunger 247 outwardly. When the plunger part 250 moves outwardly away from the port 245 fluid pressure from the branch line 237 acts on the part 250 and the end of the plunger 247 to move the plunger outwardly to a position where the port 246 is uncovered. Thus when the pressure builds up in the line 235 and its branches 236 and 237 after actuation of the pistons 169, 89 and 201, the valve 240 opens to permit the flow of fluid pressure through the line 238 to the cylinders 219. This provides for the actuation of the means 21 following the actuation of the means 20 and the conditioning of the die 86. In accordance with the invention the pistons 169 and 89 move the dies 156 and the die 86 to their active positions before sufficient pressure is applied to the piston 201 to cause the knives 189 and 197 to cut through the stock S. Upon completion of the down stroke of the piston 201 and its dies 182 the pressure builds up in the line 237 to open the valve 240, as described above. Pressure thus admitted to the line 238 acts on the pistons 220 to move the arms 211 inwardly so that the die parts 216 bend the end portions of the transverse member 12 to complete the eyes E. A fluid pressure line 251 extends from the line 238 to the cylinders 98 of the means 16. A pressure relief or control valve 252 similar to the valve 240 is connected in the line 251. The valve 252 opens when a given pressure builds up in the line 238 following the actuation of the pistons 220. When the valve 252 opens fluid pressure admitted to the line 251 operates the pistons 99 to actuate the means 16 and form the bends 13 in the frame members 11. The die 86 is held in the active position by the pressure acting on the piston 89 during the operation of the pistons 99 and the bending dies 87.

A pipe or line 253 extends from the line 251 to the cylinder 45 of the feed means 14. The line 253 communicates with the forward end of the cylinder 45. A valve 254 similar to the above described valve 240 is connected in the line 253. The valve 254 is designed to open when the fluid pressure in the line 251 has built up to a given value after actuation of the pistons 99. The fluid pressure thus admitted to the line 253 acts on the piston 46 to return the piston and the carriage 25 of the means 14 to their retracted positions for the next feed stroke. Fig. 6 of the drawings illustrates the elements of the means 14 in the retracted condition.

A fluid pressure return line 255 extends from adjacent the cylinder 45 to the fluid supply tank 231. A valve 256 is provided to control communication of the forward end of the cylinder 45 and the line 253 with the return line 255. The valve 256 is in the nature of a cylinder and piston control valve. The piston 257 of the valve 256 has a rod 258 extending in parallel relation to the rod 47 of the piston 46. A cross head 259 is secured to the piston rod 47 and carries a yoke 260 adapted to move along the piston rod 258. Spaced adjustable stops 261 are provided on the rod 258 and are engageable by the yoke 260. When the piston 46 is traveling rearwardly in the cylinder 45 the valve piston 257 is in a position where it closes off communication between the return line 255 and the line 253. When the piston 46 approaches the end of its return stroke the yoke 260 engages a stop 261 to move the piston 257 to a position where the line 253 is put in communication with the return line 255. This relieves the pressure on the piston 46 and allows a free circulation of fluid through the fluid pressure lines from the pump 230 to the tank 231. At this time the operator may move the valve V to a neutral position.

A line 262 extends from the valve V to the rear end of the cylinder 45. An automatic control valve 263 is connected between the line 262 and the return line 255. The valve 263 may be similar to the valve 256 and its piston 264 has a rod 265 extending in parallel relation to the rod 47. A yoke 266 on the cross head 259 moves along the piston rod 265 without affecting the piston 264. Spaced adjustable stops 267 are provided on the rod 265 and are engageable by the yoke 266. During the above described return stroke of the piston 47 the piston 264 is in the position illustrated in Fig. 22 where the pipe 262 and the cylinder 45 are in free communication with the return line 255. During the forward or active stroke of the piston 46 the piston 264 is in a position where it closes off communication between the line 262 and the return line 255. When the piston 46 approaches the end of its active forward stroke the yoke 266 engages a stop 267 to reverse the valve 264 and open the line 262 to the return line 255. This, of course, relieves pressure on the piston 46 and stops the forward stroke of the piston. Simultaneously with the opening of the valve 263 the valve 256, which has been open during the active stroke of the piston 46, is operated by engagement of the yoke 260 with a stop 261 to close off communication between the line 253 and the return line 255. By adjusting the stops 261 and 267 the stroke of the means 14 may be changed to feed the longitudinal frame members 10 any selected distance at each operation.

The actuating and control means 22 further includes a fluid pressure system for operating the feed means 18. In the typical arrangement illustrated in Fig. 22 the means for operating the cylinder and piston mechanism 129—130 of the means 18 is in the form of a pneumatic means, it being apparent that it may be a hydraulic means, if preferred. The fluid pressure means for controlling and actuating and feed means 18 includes a compressor 268 delivering air under pressure through a pipe line 269. Pipes 270 communicate with opposite ends of the cylinder 129. A manually operable valve 271 is provided to control the delivery of fluid pressure to the cylinder pipes 270. The valve 271 may be in the nature of a balanced slide valve or piston valve and the supply line 269 communicates with its opposite end portions. The cylinder lines 270 communicate with the valve 271 at longitudinally spaced points to be alternately opened to the pipe line 269 and to a discharge 272 when the valve 271 is reversed or operated. It will be apparent how the operator by reversing or operating the valve 271 may control the means 18 to intermittently feed the stock S to the unit A.

Manually controlled means is provided for supplying fluid under pressure to the cylinders 108 of the means 17. This fluid pressure actuating means may include a valve 273 similar to the valve 271. The air pressure supply line 269 extends to the valve 273 and has communication with its opposite end portions. Cylinder pipes 274 communicate with the valve 273 at spaced points and extend to the cylinders 108. Each pipe 274 communicates with one end of each cylinder 108. One pipe 274 has communication with the right end of one cylinder 108 and the left end of the other cylinder 108 and the other pipe 274 has communication with the left end of the first mentioned cylinder 108 and the right end of the second mentioned cylinder 108. This arrangement of pipes is such that reversal or operation of the valve 273 causes operation of the pistons 109 in opposite directions. The valve 273 has an outlet or discharge 275 providing for the release of fluid from behind the pistons 109 during their movements.

In the operation of the machine of this invention it may be assumed that the members 10 and 11 are fed or introduced to their respective feed means 14 and 15 and that the stock S is being fed to the feed means 18. Assuming the parts to be in the neutral or returned conditions the operator may first operate the valve 271 to actuate the feed means 18 so that a length of stock S is fed to the unit A. The valve V may then be operated to pass fluid under pressure to the line 235. As explained above, the fluid under pressure in the line 235 actuates the pistons 201, 89 and 169. These pistons are actuated against the tension or resiliency of the springs 208, 95 and 175, respectively. Actuation of the piston 201 brings the dies 182 against the stock S and ultimately results in the cutting off of the member 12 and the initial bending of the same. However, the resistance offered to downward movement of the piston 201 for these operations retards the movement of the piston and the pistons 89 and 169 complete their strokes before the piston 201. Actuation of the piston 89 moves the die 86 to its up or active position and operation of the piston 169 brings the anvil dies 156 to their active positions. When the pistons 201, 89 and 169 have completed their active strokes the stock S is cut off to provide a member 12 and the member 12 is initially bent, the die 86 is in its active position and the anvil dies 156 are in their active positions. The line 235 remains in communication with the fluid pressure supply line 232 and the pressure builds up in the lines 235 and 237.

When the pressure in the lines 235 and 237 has built up to a given value the valve 240 opens to admit the fluid pressure to the cylinders 219. This operates the pistons 220 so that the arms 211 are swung inwardly. Inward swinging of the arms 211 brings the die parts 216 against the bent end portions of the member 12 to complete the eye E and thus complete the ties between the frame members 10, 11 and 12. When the pistons 220 have been fully operated the pressure builds up in the line 238 and when it reaches a given value the valve 252 opens so that the fluid pressure is delivered to the cylinders 98 This actuates the pistons 99 to move the bending dies 87 inwardly against the work or members 11 The dies 87 bend the members 11 against the die 86 to form the bends 13 in the members.

Following the actuation of the pistons 99 pressure builds up in the line 251 and when this pressure reaches a given value the valve 254 opens to supply fluid under pressure to the front end of the cylinder 45. At this time the valve 256 closes communication between the line 253 and the return line 255 and the piston 264 of the valve 263 is in its neutral position where the line 262 and the rear end of the cylinder 45 communicates with the return line 255 The fluid under pressure delivered to the front end of the cylinder 45 returns the piston 46, the carriage 25 and the parts associated therewith to their retracted positions. Simultaneously with, or immediately following the above described operation of the pistons 99 and dies 87 the operator may open or reverse the valve 273 to deliver the fluid under pressure to the cylinders 108, so that the means 17 assists the means 16 in bending the members 11 and in crossing the members during their shaping or bending At the end of the cycle of operations the operator moves or opens the valve V to put the line 235 in communication with the return 255. The springs 208, 95, 175, 229 and 196 thereupon return their respective pistons 201, 89, 169, 220 and 99 and their respective dies 182, 86, 156, 216 and 87 to their retracted positions. Preparatory to the next operation the operator actuates the valve V to supply fluid under pressure to the line 262 This delivers fluid under pressure to the rear end of the cylinder 45 and the piston 46 is moved forwardly. During the forward movement of the piston 46 the come-along units 33 advance the frame members 10 and the come-along units 65 advance the frame members 11. The come-along units 33 are carried by the carriage 25 to be directly moved by the piston 46 while the come-along units 65 on the carriage 57 are advanced through the medium of the above described rack and pinion differential mechanism 71—72—30—81. At the completion of the feeding operations of the means 14 and 15 the valve V is operated to cut off the supply of fluid pressure to the line 262. The advancement of the members 10 by the means 14 of course results in advancement of the completed or fabricated portion of the frame. It is to be observed that the dies 86 and 87 and the dies 156 are in their retracted positions and that the dies 182 are raised when the frame is advanced for the next operation so that the dies do not interfere with the free advancement of the frame. The valve 271 may then again be operated to provide for the advancement of the stock S into the unit A by the means 18 and the above described cycle of operations may be repeated.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A machine for fabricating building frames comprising a tie forming unit, means for feeding rigid longitudinal frame members to the unit, fluid pressure operated means for operating said means, means for feeding a rigid transverse member to the unit to be tied to the longitudinal members, fluid pressure operated means for operating the last mentioned means, fluid pressure operated means for operating the tie forming unit, and a fluid pressure control for actuating the several fluid pressure operated means in sequence.

2. A machine for fabricating a frame comprising a tie forming unit, means for intermittently feeding spaced longitudinal frame members to the unit, means for intermittently feeding a diagonal member to the unit, means for bending the diagonal member to zigzag shape before it reaches the unit, and means for feeding a transverse member to the unit to be tied thereby to the longitudinal and diagonal members.

3. A machine for offsetting and securing a cross rod and one or more diagonal rods to two spaced longitudinal rods comprising, a tie forming unit, means for intermittently feeding the longitudinal rods to said unit, means for intermittently feeding a diagonal rod to said unit, and means for positioning the cross rod across the longitudinal rods, said unit including means for offsetting the intermediate portion of the cross rod to lie in substantially the same plane as the longitudinal rods and for holding the several rods in a given relation, and means for bending the end parts of the cross rod about the longitudinal rods and the diagonal rods.

4. A machine for fabricating a frame having spaced longitudinal members, a zigzag brace member, and spaced transverse ties, the machine comprising means for simultaneously intermittently advancing the longitudinal members and the brace member, means for bending the intermediate portions of the ties to lie in substantially the same plane as the longitudinal member and the brace member, means for bending tie eyes in the end parts of the ties to tie them to the longitudinal and brace members, and a fluid pressure system for operating the several means including a single manual valve.

5. A machine for fabricating a frame having spaced longitudinal members, a zigzag brace member, and spaced transverse ties, the machine comprising means for simultaneously intermittently advancing the longitudinal members and the brace member, die means for bending the brace member to zigzag shape, means for feeding transverse ties across the longitudinal members, means for offsetting the intermediate parts of the transverse ties to lie in substantially the same planes as the longitudinal members, and means for forming eyes on the ties to engage about the longitudinal members and the brace member.

6. A machine for fabricating a frame having spaced longitudinal members, a zigzag brace member, and spaced transverse ties, the machine comprising means for simultaneously intermittently advancing the longitudinal members and the brace member, means for bending the brace member to zigzag shape, means for feeding the ties transversely of the longitudinal members, means for offsetting the intermediate portions of the ties to lie in the same planes as the longitudinal and brace members, means for bending the end portions of the ties into eyes which engage about the longitudinal and brace members, and a fluid pressure system for operating and controlling the aforementioned means.

7. A machine for fabricating a frame having spaced longitudinal members, zigzag brace members, and spaced transverse ties, the machine comprising means for bending the brace members into zigzag shape, anvil die means for the longitudinal members and brace members, die means initially bending the transverse ties against longitudinal members and the brace members to have their intermediate portions in the same planes as the longitudinal members and the brace members, and means for wrapping the end portions of the ties about the longitudinal members and brace members to form tie eyes.

8. A machine for fabricating a frame having spaced longitudinal members, a zigzag brace member, and spaced transverse ties, the machine comprising anvil die means supporting the longitudinal and brace members, die means initially bending the ties against the longitudinal and brace members and clamping the ties against the members and clamping the members against the anvil die means, and swinging dies bending the end portions of the ties about the said members to form eyes while the members are clamped against the anvil die means.

9. A machine for fabricating a frame having spaced longitudinal members, a zigzag brace member, and spaced transverse ties, the machine comprising anvil dies for supporting the longitudinal and brace members, means positioning the ties transversely of the members, die means cutting the ties to length and bending the ties against the longitudinal and brace members and thus clamping the longitudinal and brace members against the anvil dies, and die means bending the end portions of the ties about the longitudinal and brace members to form tying eyes.

10. In a machine for fabricating a frame having spaced longitudinal members, diagonal members and spaced cross members, the combination of a unit for tying the cross members to the longitudinal members and the diagonal members, a shiftable carriage, means on the carriage engaging the longitudinal members to advance the same to the unit, a second shiftable carriage, means on the second carriage engaging the diagonal members to advance the same to the unit, and a single cylinder and piston means for shifting both carriages.

11. In a machine for fabricating a frame having spaced longitudinal members, diagonal members and spaced cross members, the combination of a unit for tying the cross members to the longitudinal members and the diagonal members, a shiftable carriage, means on the carriage engaging the longitudinal members to advance the same to the unit, means for bending the diagonal members to zigzag shape, a second shiftable carriage, means on the second carriage engaging the diagonal members to advance the same to the bending means and the unit, means for shifting the first carriage, and a differential driving connection between the carriages whereby the second carriage is advanced a greater distance than the first carriage.

12. In a machine for fabricating a frame having spaced longitudinal members, diagonal members and spaced cross members, the combination of a unit for tying the cross members to the longitudinal members and the diagonal members, a shiftable carriage, means on the carriage engaging the longitudinal members to advance the same to the unit, means for bending the diagonal members to zigzag shape, a second shiftable carriage, means on the second carriage engaging the diagonal members to advance the same to the bending means and the unit, means for shifting the first carriage, and a differential rack and pinion driving connection between the carriages whereby the second carriage is advanced a greater distance than the first carriage.

13. In a machine for fabricating a frame having spaced longitudinal members, diagonal members and spaced cross members, the combination of a unit for tying the cross members to the longitudinal members and the diagonal members, a shiftable carriage, means on the carriage engaging the longitudinal members to advance the same to the unit, means for bending the diagonal members to zigzag shape, a second shiftable carriage, means on the second carriage engaging the diagonal members to advance the same to the bending means and the unit, means for reciprocating the first carriage, means for holding the members against movement during the return strokes of the carriage, and a speed changing driving connection between the carriages whereby the second carriage is operated at a greater speed than the first carriage.

14. In a machine of the character described, means for simultaneously intermittently advancing two spaced members, die means for simultaneously bending the members to form a bend in each and causing the unbent portions of the members to cross, and means for assisting in the crossing of the members.

15. In a machine of the character described, a die having converging faces on its opposite ends, dies shiftable toward said ends to simultaneously bend spaced frame members in conformity thereto, and means for crossing the members during said bending.

16. In a machine of the character described, a die having converging faces on its opposite ends, dies shiftable toward said ends to simultaneously bend spaced frame members in conformity thereto, and means for crossing the members during said bending, said means including cylinders, pistons operable in the cylinders, rods on the pistons, and parts connected with the rods and engaging the members to transmit movement thereto.

17. A machine for fabricating a frame having spaced longitudinal members, a zigzag brace member, and spaced transverse ties, the machine comprising means for simultaneously intermittently advancing the longitudinal members and the brace member, means for adjusting the advancing means to vary the spacing between the longitudinal members, die means for bending the brace member to zigzag shape, means for feeding the ties transversely of the longitudinal members, and means for bending tie eyes on the ties to tie them to the longitudinal and brace members.

FRANK Y. PEARNE.